(12) United States Patent
Chan et al.

(10) Patent No.: US 7,245,383 B2
(45) Date of Patent: Jul. 17, 2007

(54) OPTICAL IMAGE MEASURING APPARATUS FOR OBTAINING A SIGNAL INTENSITY AND SPATIAL PHASE DISTRIBUTION OF INTERFERENCE LIGHT

(75) Inventors: Kinpui Chan, Yamagata (JP); Masahiro Akiba, Yamagata (JP); Yasufumi Fukuma, Tokyo (JP); Hiroyuki Otsuka, Tokyo (JP); Hisashi Tsukada, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 338 days.

(21) Appl. No.: 11/062,592

(22) Filed: Feb. 23, 2005

(65) Prior Publication Data

US 2005/0190374 A1 Sep. 1, 2005

(30) Foreign Application Priority Data

Feb. 26, 2004 (JP) ............................. 2004-052195

(51) Int. Cl.
*G01B 9/02* (2006.01)
(52) U.S. Cl. ..................................... 356/497; 356/484
(58) Field of Classification Search ................ 356/496, 356/479, 484, 485, 489
See application file for complete search history.

(56) References Cited

U.S. PATENT DOCUMENTS 6,381,015 B1 * 4/2002 Sonehara et al. ........... 356/497
6,496,269 B2 * 12/2002 Mitsutani et al. ........... 356/512
7,133,137 B2 * 11/2006 Shimmick ................... 356/497

FOREIGN PATENT DOCUMENTS

JP 2001-066247 3/2001
JP 2001-330558 11/2001

OTHER PUBLICATIONS

Japanese Journal of Optics, vol. 28, No. 3, 1999, Naohiro Tanno, Kogaku, pp. 115-125.
Patent Abstracts of Japan; Japanese Publ. No. 2001-330558, Nov. 30, 2001; Japan Science & Technology Corp; 1 page.
European Search Report mailed Aug. 11, 2001, 3 pages.

* cited by examiner

*Primary Examiner*—Tarifur Chowdhury
*Assistant Examiner*—Marissa J. Detschel
(74) *Attorney, Agent, or Firm*—Armstrong, Kratz, Quintos, Hanson & Brooks, LLP

(57) ABSTRACT

To provide an optical image measuring apparatus capable of calculating an intensity of a direct current component composed of background light based on a result obtained by detection of interference light and obtaining a signal intensity of the interference light using the calculated intensity. The apparatus includes: an optical interference system to divide a light beam into signal light and reference light, and the signal light propagating through an object to be measured and the reference light are superimposed to produce interference light; beam splitters for dividing it into three interference light beams; shutters to perform sampling; photo detectors for detecting the sampled interference light beams and converting them into electrical signals; and a signal processing portion for calculating the signal intensity of the interference light and the spatial phase distribution thereof based on the electrical signals.

13 Claims, 7 Drawing Sheets

OPTICAL IMAGE MEASURING APPARATUS FOR OBTAINING A SIGNAL INTENSITY AND SPATIAL PHASE DISTRIBUTION OF INTERFERENCE LIGHT

BACKGROUND OF THE INVENTION

1. Field of the Invention

The present invention relates to an optical image measuring apparatus employing a structure in which an object to be measured which is particularly a light scattering medium is irradiated with a light beam and a surface form or inner form of the object to be measured is measured based on a reflected light beam or a transmitted light beam to produce an image of a measured form. More particularly, the present invention relates to an optical image measuring apparatus for measuring the surface form or inner form of the object to be measured by using an optical heterodyne detection method to produce the image of the measured form.

2. Description of the Related Art

In recent years, attention has been given to optical imaging techniques for producing an image of a surface or inner portion of an object to be measured using a laser light source or the like. In contrast to the conventional X-ray CT technique, optical imaging technique is not hazardous to human bodies. Therefore, its application to the field of biomedical imaging is highly desired.

An example of a typical method of the optical imaging technique is a low coherent interference method (also called "optical coherent tomography" or the like). This method uses the low coherence of a broad band light source having a wide spectral width, such as a super luminescent diode (SLD). According to this method, reflection light from an object to be measured or light transmitting therethrough can be detected with a superior distance resolution of µm order (for example, see Naohiro Tanno, Kogaku (Japanese Journal of Optics), Volume 28, No. 3, 116 (1999)).

FIG. 6 shows a fundamental structure of a conventional optical image measuring apparatus based on a Michelson interferometer, serving as an example of an apparatus using the low coherent interference method. An optical image measuring apparatus 100 includes a wide band light source 101, a mirror 102, a beam splitter (half mirror) 103, and a photo detector 104. An object to be measured 105 is made of a scattering medium. A light beam from the broad band light source 101 is divided by the beam splitter 103 into two parts, that is, a reference light R propagating to the mirror 102 and a signal light S propagating to the object to be measured 105. The reference light R is a light beam reflected by the beam splitter 103. The signal light S is a light beam transmitting through the beam splitter 103.

Here, as shown in FIG. 6, the propagating direction of the signal light S is set as a z-axis and a plane orthogonal to the propagating direction of the signal light S is defined as an x-y plane. The mirror 102 is shiftable in both of the forward and backward direction, as indicated by a double-headed arrow in FIG. 6 (z-scanning direction).

The reference light R is subjected to a Doppler frequency shift by z-scanning when it is reflected on the mirror 102. On the other hand, the signal light S is reflected from the surface of the object to be measured 105 and from the inner layers thereof when the object to be measured 105 is irradiated with the light. Because the object to be measured 105 is a scattering medium, the signal light S reflected from the object may include the multiple scattered light waves having random phases. The signal light reflected from the object to be measured 105 and the reference light reflected from the mirror 102 to be subjected to the frequency shift are superimposed on each other by the beam splitter 103 to produce an interference light.

In the image measurement using the low coherent interference method, interference occurs only when a difference in optical path length between the signal light S and the reference light R is within the coherent length, of the broad band light source 101, which is of the order of several µm to tens of µm. In addition, only the component of the signal light S where phase is correlated to that of the reference light R may interfere with the reference light R. That is, only the coherent signal light component of the signal light S selectively interferes with the reference light R. Based on these principles, the position of the mirror 102 is shifted by the z-scanning operation to vary the optical path length of the reference light R, so that a light reflection profile of the inner layers of the object to be measured 105 is measured. The interference light is detected by the photo detector 104 during each z-scan. An electrical signal (heterodyne signal) output from the photo detector 104 provides a backscatter profile of the inner layers of object to be measured 105, and a two-dimensional cross-sectional image of the object to be measured 105 is produced by scanning the signal lights S across the object to be measured 105 while recording the reflectance profile at each transverse position (see Naohiro Tanno, Kogaku (Japanese Journal of optics), Volume 28, No. 3, 116 (1999)).

Assume that an intensity of the reference light R and an intensity of the signal light S which are superimposed by the beam splitter 103 are given by $I_r$ and $I_s$, respectively, and a frequency difference between the reference light R and the signal light S and a phase difference therebetween are given by $f_{if}$ and $\Delta\theta$, respectively. In this case, a heterodyne signal as expressed by the following expression is outputted from the photo detector (for example, Yoshizawa and Seta "Optical Heterodyne Technology (revised edition)", New Technology Communications (2003), p. 2).

$$i(t) \propto I_r + I_s + 2\sqrt{I_r I_s} \cos(2\pi f_{if} t + \Delta\theta) \qquad (1)$$

The third term of the right side of the expression (1) indicates an alternating current electrical signal and the frequency $f_{if}$ thereof is equal to the frequency difference between the reference light R and the signal light S. The frequency $f_{if}$ of an alternating current component of the heterodyne signal is called a beat frequency or the like. The first and second terms of the right side of the expression (1) indicate the direct current components of the heterodyne signal and correspond to the background light intensity.

However, when the two-dimensional cross-sectional image is intended to be obtained by means of the conventional low coherent interference method, it is necessary to scan the signal light beam S across the object to be measured 105 and to successively detect reflection light waves from each transverse position. Therefore, the measurement of the object to be measured 105 can be time consuming. In addition, it is hard to shorten a measurement time in view of measurement fundamentals.

In views of such problems, an optical image measuring apparatus for shortening a measurement time has been proposed. FIG. 7 shows a fundamental structure of an example of such an apparatus. As shown in FIG. 7, an optical image measuring apparatus 200 includes a broad band light source 201, a mirror 202, a beam splitter (half mirror) 203, a two-dimensional photo sensor array 204 serving for light detection, and lenses 206 and 207. A light beam from the light source 201 is converted into a parallel light flux by the lenses 206 and 207 and a beam diameter thereof is increased thereby. Then, the parallel light flux is divided by the beam splitter 203 into two, that is, the reference light R and the signal light S. The reference light R is subjected to a Doppler frequency shift by z-scanning of the mirror 202. On the other hand, the signal light S is incident on the object to be measured 205 over a wide area of the x-y plane, as a consequence of a widened beam diameter. Therefore, the signal light S reflected from the object to be measured 205 contains information related to the surface and inner portion of the object to be measured 205 over a wide area. The reference light R and the signal light S are superimposed on each other by the beam splitter 103 and detected by the elements (photo sensors) arranged in parallel on the surface of the two-dimensional photo sensor array 204. Thus, it is possible to obtain a two-dimensional cross-sectional image of the object to be measured 205 in real time without scanning the signal lights.

An apparatus described by K. P. Chan, M. Yamada, and H. Inaba in Electronics Letters, Vol. 30, 1753 (1994) has been known as such a non-scanning type optical image measuring apparatus. In the apparatus described in the same document, a plurality of heterodyne signals outputted from a two-dimensional photo sensor array are inputted to signal processing systems arranged in parallel to detect the amplitude and phase of each of the heterodyne signals.

However, when spatial resolution of an image is intended to be improved, it is necessary to increase the number of elements of the array. In addition, it is necessary to prepare a signal processing system including the number of channels corresponding to the number of elements. Therefore, it is likely to be hard to actually use the apparatus in fields that require a high-resolution image, such as a medical field and an industrial field.

Thus, the inventors of the present invention proposed the following non-scanning type optical image measuring apparatus in JP 2001-330558 A (claims, specification paragraphs [0068] to [0084], FIGS. 1 and 3). The optical image measuring apparatus according to the present proposal includes a light source for emitting a light beam, an interference optical system, and a signal processing portion. In the interference optical system, the light beam emitted from the light source is divided into two, that is, a signal light propagating through an examined object locating position in which an object to be examined is located, and a reference light propagating along an optical path different from an optical path passing through the examined object locating position. The signal light propagating through the examined object locating position and the reference light propagating along a different optical path are superimposed on each other to produce the interference light. The interference optical system includes a frequency shifter, light cutoff devices, and photo sensors. The frequency shifter shifts a frequency of the signal light and a frequency of the reference light relative to each other. In order to receive the interference light in the interference optical system, the interference light is divided into two parts. The light cutoff devices periodically cut off the two divided parts of the interference light to generate two interference light pulse trains with a phase difference of 90 degrees therebetween. The photo sensors respectively receive the two interference light pulse trains. The photo sensors each have a plurality of light receiving elements which are spatially arranged and each of which separately obtains a light receiving signal. The signal processing portion combines a plurality of light receiving signals obtained by each of the photo sensors to generate signals of the signal light which correspond to respective points of interest of a surface or inner layers of the object to be examined which is located in the examined object locating position on a propagation path of the signal light.

In the optical image measuring apparatus, the interference light in which the reference light and the signal light interfere with each other is divided into two parts and the two parts of the interference light are received by the two photo sensors (two-dimensional photo sensor arrays) and respectively sampled by the light cutoff devices disposed in fronts of both sensor arrays. A phase difference of $\pi/2$ is provided between sampling periods of the two divided parts of the interference light. Therefore, an intensity of the signal light and an intensity of reference light which compose background light of the interference light and phase quadrature components (sine component and cosine component) of the interference light are detected. In addition, an intensity of the background light included in the outputs from both the sensor arrays is subtracted from the outputs of both the sensor arrays to calculate two phase quadrature components of the interference light. An amplitude of the interference light is obtained based on a result obtained by calculation.

In the case of measurement using the optical image measuring apparatus described in JP 2001-330558 A, it is necessary to measure and obtain an intensity of a direct current component corresponding to the background light of the interference light included in the outputs from the two-dimensional photo sensor arrays in advance. Therefore, when the intensity of the direct current component can be measured, the availability of the measurement is shown. However, in the case where it is hard to measure the intensity of the direct current component corresponding to the background light, such as the case where an object to be measured, a part thereof, or an inner portion thereof is moving, it is difficult to measure the object to be measured using the optical image measuring apparatus.

An available image sensor such as a CCD (charge-coupled device) camera has been widely known as the two-dimensional photo sensor array of the optical image measuring apparatus. However, up to now, a problem has been recognized in that a currently available CCD camera cannot follow a beat frequency of a heterodyne signal which is of the order of several kHz to several MHz because of a low frequency response characteristic. The feature of the optical image measuring apparatus which is proposed by the inventors of the present invention and described in JP 2001-330558 A is that the measurement is performed using the low frequency response characteristic to advantage based on the sufficient recognition of the problem.

SUMMARY OF THE INVENTION

The present invention has been made in view of the above-mentioned circumstances. An object of the present invention is to provide an optical image measuring apparatus capable of effectively obtaining a signal intensity of interference light and a spatial phase distribution thereof.

More particularly, an object of the present invention is to provide an optical image measuring apparatus capable of calculating an intensity of a direct current component composed of background light of interference light based on a result obtained by detection of the interference light, and obtaining a signal intensity of the interference light and a spatial phase distribution thereof based on a result obtained by the calculation.

To achieve the above object, according of the present invention, there is provided an optical image measuring apparatus for forming an image of an object to be measured based on interference light, including: a light source for emitting a light beam; an interference optical system that divides the light beam emitted from the light source into signal light propagating through the object to be measured and reference light propagating through a predetermined reference object, shifts a frequency of the signal light and a frequency of the reference light relative to each other, and then superimposes the signal light propagating through the object to be measured and the reference light propagating through the predetermined reference object on each other to produce the interference light; sampling means for dividing the interference light produced by the interference optical system into at least three interference light beams, sampling at least the three interference light beams at predetermined intervals, and outputting the sampled interference light beams as electrical signals; and calculation means for calculating a signal intensity of the interference light and a spatial phase distribution thereof based on the electoral signals outputted from the sampling means.

In addition, according to the present invention, there is provided an optical image measuring apparatus, in which the sampling means includes: a plurality of beam splitters for dividing the interference light produced by the interference optical system into two; light quantity changing means for sampling the interference light beams separated by the plurality of beam splitters by changing quantities of the interference light beams propagating on optical paths thereof at the predetermined intervals, which is located on the optical paths; and a photo detector for detecting the interference light beams sampled by the light quantity changing means and converting the detected interference light beams into the electrical signals.

In addition, according to the present invention, there is provided an optical image measuring apparatus, in which the sampling means includes: a first beam splitter for dividing the interference light produced by the interference optical system into first and second interference light beams; first light quantity changing means for sampling the first interference light beam of the interference light divided by the first beam splitter by changing a quantity of the first interference light beam propagating on an optical path thereof at the predetermined intervals, which is located on the optical path of the first interference light beam; a first photo detector for detecting the first interference light beam sampled by the first light quantity changing means and converting the detected first interference light beam into an electrical signal; a second beam splitter for dividing the second interference light beam of the interference light divided by the first beam splitter into third and fourth interference light beams; second light quantity changing means for sampling the third interference light beam of the second interference light beam divided by the second beam splitter by changing a quantity of the third interference light beam propagating on an optical path thereof at the predetermined intervals, which is located on the optical path of the third interference light beam; a second photo detector for detecting the third interference light beam sampled by the second light quantity changing means and converting the detected third interference light beam into an electrical signal; third light quantity changing means for sampling the fourth interference light beam of the second interference light beam divided by the second beam splitter by changing a quantity of the fourth interference light beam propagating on an optical path thereof at the predetermined intervals, which is located on the optical path of the fourth interference light beam; and a third photo detector for detecting the fourth interference light beam sampled by the third light quantity changing means and converting the detected fourth interference light beam into an electrical signal.

In addition, according to the present invention, there is provided an optical image measuring apparatus, in which the calculation means calculates an amplitude of an alternating current component of the interference light based on the electrical signals from the first photo detector, the second photo detector, and the third photo detector.

In addition, according to the present invention, there is provided an optical image measuring apparatus, in which the calculation means calculates a sin component and a cos component of the alternating current component of the interference light based on the electrical signals from the first photo detector, the second photo detector, and the third photo detector, and calculates the amplitude based on the sin component and the cos component.

In addition, according to the present invention, there is provided an optical image measuring apparatus, in which the calculation means calculates a spatial phase distribution of the interference light based on the electrical signals from the first photo detector, the second photo detector, and the third photo detector.

In addition, according to the present invention, there is provided an optical image measuring apparatus, in which the calculation means calculates a sin component and a cos component of the alternating current component of the interference light at a certain measurement time based on the electrical signals from the first photo detector, the second photo detector, and the third photo detector, and calculates the spatial phase distribution based on the sin component and the cos component.

In addition, according to the present invention, there is provided an optical image measuring apparatus, in which the calculation means calculates a frequency of the interference light based on calculated spatial phase distributions of the interference light at two measurement times.

In addition, according to the present invention, there is provided an optical image measuring apparatus, in which the sampling means divides the interference light into at least the three interference light beams such that intensities of the interference light beams are equal to one another.

In addition, according to the present invention, there is provided an optical image measuring apparatus, in which the first beam splitter divides the interference light produced by the interference optical system into the first and second interference light beams at an intensity ratio of 1:2, and the second beam splitter divides the second interference light beam propagating on the optical path thereof into the third and fourth interference light beams whose intensities are equal to each other.

In addition, according to the present invention, there is provided an optical image measuring apparatus, in which the light quantity changing means is a shutter for sampling the interference light beams separated by the plurality of beam splitters by changing quantities of the interference light beams propagating on optical paths thereof at the predetermined intervals, which is located on the optical paths.

In addition, according to the present invention, there is provided an optical image measuring apparatus, in which the interference optical system includes an optical element for increasing a beam diameter of the light beam from the light source, and the photo detector is a two-dimensional photo detector array for detecting the interference light produced by the interference optical system based on the light beam whose beam diameter is increased by the optical element.

According to the optical image measuring apparatus of the present invention, it is possible that the parts of the interference light whose optical path is divided into at least three optical paths are sampled for detection at predetermined intervals and the signal intensity of the interference light, the spatial phase distribution thereof, and the intensity of the direct current component composed of the background light of the interference light are obtained based on the electrical signals of a result obtained by the detection. Therefore, even when the intensity of the direct current component composed of the background light of the interference light is not measured in advance in contrast to a conventional case, the signal intensity of the interference light and the spatial phase distribution thereof can be effectively detected.

BRIEF DESCRIPTION OF THE DRAWINGS

In the accompanying drawings:

FIGS. 2A to 2C are diagrams showing an example of an interference light sampling mode of the optical image measuring apparatus according to the embodiment of the present invention, in which FIG. 2A is a graph showing a time waveform of interference light, FIG. 2B is a graph showing an example of a waveform of a sampling function, and FIG. 2C is a graph showing a waveform of sampled interference light;

DETAILED DESCRIPTION OF THE EMBODIMENT

Hereinafter, an example of an optical image measuring apparatus according to an embodiment of the present invention will be described in detail with reference to the accompanying drawings.

In brief, the optical image measuring apparatus according to the present invention has a structure in which an optical path of interference light in which reference light and signal light interfere with each other is divided into three or more and divided parts of the interference light are sampled for detection at predetermined intervals and the signal intensity of the interference light, the spatial phase distribution thereof, and the intensity of the direct current component composed of the background light of the interference light are obtained based on a result obtained by the detection.

[Structure of Apparatus]

Figure 1:
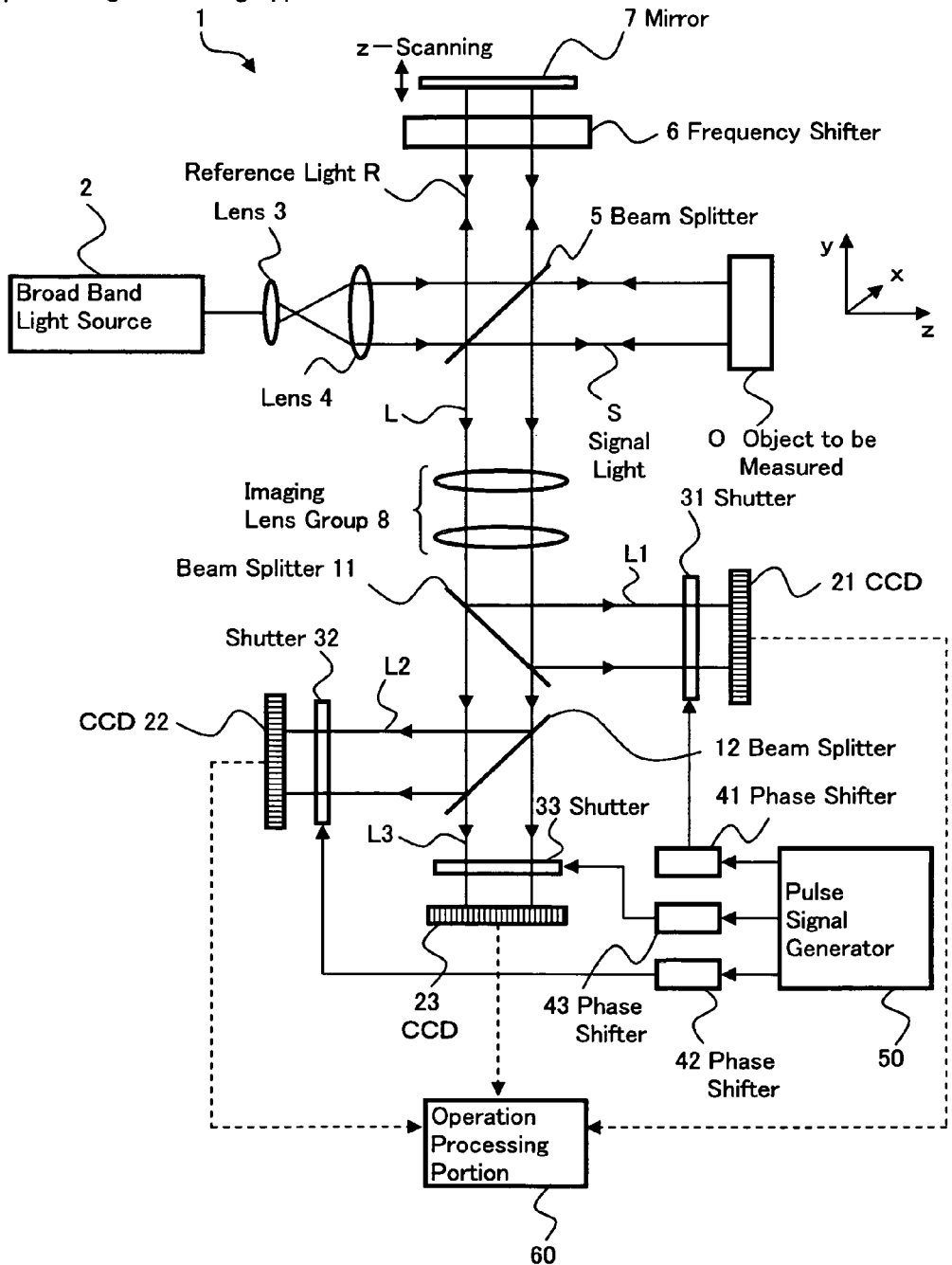
FIG. 1 is a schematic diagram showing an example of an optical image measuring apparatus according to an embodiment of the present invention.

FIG. 1 shows a schematic structure showing an optical image measuring apparatus 1 for dividing the interference light into three optical paths and performing measurement, which is constructed as the optical image measuring apparatus according to the present invention. The optical image measuring apparatus 1 is an apparatus available for, for example, medical care and industry and has a structure capable of obtaining a two-dimensional cross-sectional image of an object to be measured O which is made of a scattering medium.

As in the conventional apparatus, the optical image measuring apparatus 1 includes a broad band light source 2, lenses 3 and 4, a beam splitter 5, and a mirror 7. The light source 2 is composed of a SLD, a light emitting diode (LED), or the like and outputs a low-coherent continuous light beam. The lenses 3 and 4 convert the light beam from the light source 2 into a parallel light flux and increase a beam diameter thereof. The beam splitter 103 divides the light beam into signal light S and reference light R and superimposes the signal light S and the reference light R on each other to produce interference light L. The mirror 7 is a total reflection mirror. A frequency shifter 6 composed of an optoelectronic modulator, an acoustooptic modulator, or the like is disposed immediately in front of the mirror 7. Note that a coherent length of an available near-infrared region SLD is about 30 µm and a coherent length of a LED is about 10 µm.

The lenses 3 and 4, the beam splitter 5, the frequency shifter 6, and the mirror 7 compose "an interference optical system" in the present invention. The lenses 3 and 4 compose an "optical element for increasing a beam diameter of a light beam from a light source" in the present invention. The mirror 7 composes "a reference object" in the present invention.

The optical image measuring apparatus 1 further includes an imaging lens group 8, beam splitters 11 and 12, CCDs (cameras) 21, 22, and 23, and shutters 31, 32, and 33, which compose "sampling means" in the present invention. The imaging lens group 8 images the interference light L produced by the beam splitter 5. The beam splitters 11 and 12 divide the interference light L into three interference light beams L1, L2, and L3. Each of the CCDs 21, 22, and 23 is a storage type two-dimensional photo sensor array for interference light beam detection. The shutters 31, 32, and 33 are disposed immediately in front of the CCDs 21, 22, and 23, respectively and periodically cut off the interference light beams L1, L2, and L3, respectively. Each of the shutters 31, 32, and 33 is, for example, a high-speed shutter such as a liquid crystal shutter.

The shutters 31, 32, and 33 are not necessarily disposed immediately in front of the CCDs 21, 22, and 23, respectively. The shutters 31, 32, and 33 can be respectively disposed at arbitrary positions on respective optical paths joining branch points of the interference light beams L1, L2, and L3 separated by the beam splitters 11 and 12 with the CCDs 21, 22, and 23. That is, the shutters 31, 32, and 33 may be disposed at positions in which the respective interference light beams L1, L2, and L3 can be cut off to change received light quantities of the CCDs 21, 22, and 23 to 0.

The beam splitters 11 and 12 composes "a first beam splitter" and "a second beam splitter" in the present invention, respectively. The CCD 21 composes "a first photo detector", the CCD 22 composes "a second photo detector", and the CCD 23 composes "a third photo detector". The shutters 31, 32, and 33 compose "first light quantity changing means", "second light quantity changing means", and "third light quantity changing means", respectively, which are used for cutting off the interference light beams propagating on the respective optical paths at predetermined intervals to change light quantities thereof to "0" at the predetermined intervals.

The optical image measuring apparatus 1 further includes a pulse signal generator 50 and phase shifters 41, 42, and 43.

The pulse signal generator 50 generates a pulse signal. The phase shifters 41, 42, and 43 each shift a phase of the pulse signal generated by the pulse signal generator 50 to produce timing signals for separately controlling open-and-close timings of the respective shutters 31, 32, and 33.

The respective shutters 31, 32, and 33 cut off the interference light beams L1, L2, and L3, respectively, in response to the timing signals from the phase shifters 41, 42, and 43 at predetermined intervals in order to perform sampling. Therefore, the respective CCDs 21, 22, and 23 periodically receive the corresponding interference light beams L1, L2, and L3. As shown in FIG. 2C later, each of the interference light beams is received as a periodic pulse train. At this time, respective shutters 31, 32, and 33 are separately opened and closed, so that the pulses of the interference light beams L1, L2, and L3 detected by the CCDs 21, 22, and 23 have predetermined phase differences. The CCDs 21, 22, and 23 perform photoelectric conversion on intensities of the interference light beams L1, L2, and L3 detected at each pixel, and they output electrical signals (heterodyne signals) which are sent to a signal processing portion 60. The heterodyne signal is an electrical signal reflecting the intensity and phase of the detected interference light beam.

The signal processing portion 60 is the "calculation means" in the present invention, which executes calculation processing described later based on the heterodyne signals outputted from the CCDs 21, 22, and 23. The signal processing portion 60 analyzes a result obtained by the calculation processing, forms various images including a two-dimensional cross-sectional image of the object to be measured o based on the analyzed result, and causes a display device such as a monitor device which is not shown to display the images. The signal processing portion 60 is composed of, for example, a computer which includes a storage device storing a predetermined calculation program, such as a ROM and a CPU executing the calculation program.

A beam diameter of a light beam emitted from the light source 2 is increased by the lenses 3 and 4. The light beam is divided into the signal light S and the reference light R by the beam splitter 5. The signal light S is incident on the object to be measured o and then incident on the beam splitter 5 again as a reflection light wave including information related to a surface form and inner form of the object to be measured o.

On the other hand, the reference light R passes through the frequency shifter 6 to be subjected to frequency shift, and then propagates to the mirror 7 and is reflected thereon. A reflection light wave passes through the frequency shifter 6 again to be subjected to additional frequency shift and is incident on the beam splitter 5 again.

A part of the signal light S from the object to be measured o is reflected on the beam splitter 5. A part of the reference light R subjected to the frequency shift transmits through the beam splitter 5. Therefore, the signal light S and the reference light R are superimposed on each other by the beam splitter 5 to produce the interference light L. The interference light L transmits through the imaging lens group 8 and propagates to the beam splitter 11.

An optical path of the interference light L is divided into two by the beamsplitter 11. The interference light beam L1 reflected on the beam splitter 11 is detected by the CCD 21 through the shutter 31.

An optical path of interference light transmitting through the beam splitter 11 is further divided into two by the beam splitter 12. The interference light beam L2 reflected on the beam splitter 12 is detected by the CCD 22 through the shutter 32.

On the other hand, the interference light L3 transmitting through the beam splitter 12 is detected by the CCD 23 through the shutter 33.

It is desirable that an interference light dividing ratio of the beam splitter 11, that is, an intensity ratio of the transmitted interference light to the reflected interference light beam L1 be 2:1. In other words, it is desirable that the beam splitter 11 transmit ⅔ of total incident light and reflect ⅓ thereof. In addition, it is desirable that an intensity ratio of the interference light beam L3 transmitting through the beam splitter 12 to the interference light beam L2 reflected thereon be 1:1. In other words, it is desirable that the beam splitter 12 transmit ½ of total incident light and reflect ½ thereof. Therefore, intensity levels of the interference light beams L1, L2, and L3 detected by the CCDs 21, 22, and 23 are made equal to one another, so that it is suitable to perform calculation processing described later. An intensity ratio between the divided interference light beams is not limited to those and thus can be set as appropriate.

[Measurement Mode]

Subsequently, a measurement mode with respect to the signal intensity of the interference light L and the spatial phase distribution thereof, that is, an intensity of the heterodyne signal and phase information thereof, which are obtained by the optical image measuring apparatus 1 will be described. In the optical image measuring apparatus 1, the interference light beams L1, L2, and L3 for which phase differences are provided according to the open-and-close timings of the shutters 31, 32, and 33 are sampled for detection. Therefore, the signal intensity of the interference light L and the spatial phase distribution thereof are obtained. Note that phase differences of sampling functions (described later) for controlling the open-and-close timings of the shutters 31, 32, and 33 are set in advance.

Figure 2:
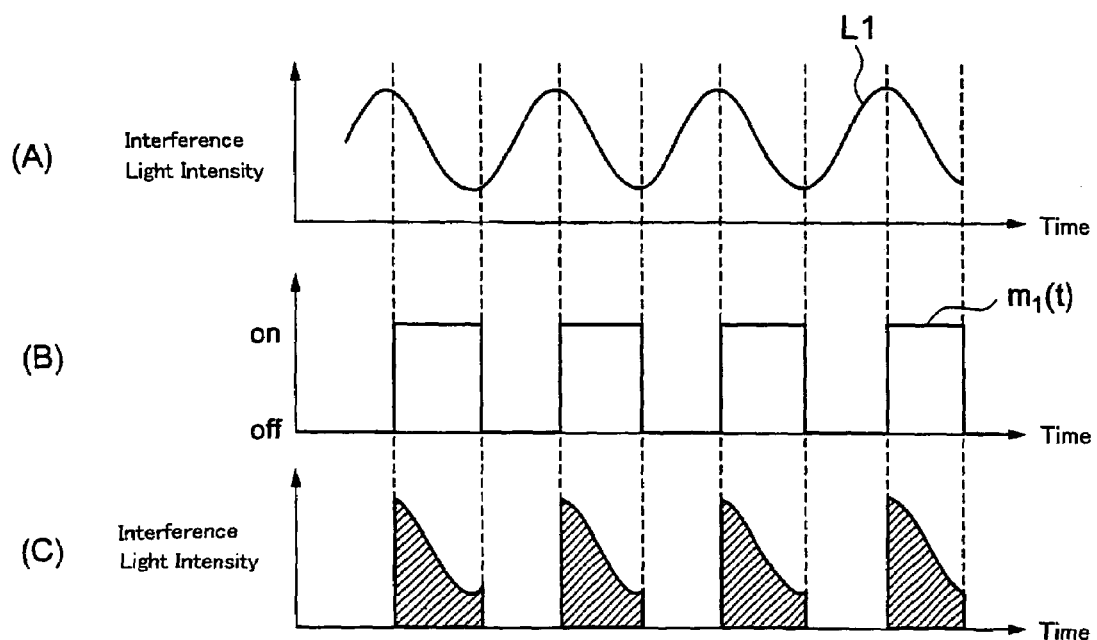

FIG. 2 is an explanatory diagram showing sampling operation of the interference light beam L1 which is performed by the shutter 31. FIG. 2A shows a time waveform of the interference light beam L1 received by the CCD 21 serving as the photo sensor. As expressed by the expression (1), the heterodyne signal related to the interference light beam L1 includes: a direct current component composed of the background light proportional to the intensity of the reference light R and the intensity of the signal light S; and an alternating current component having a beat frequency (which is called a beat signal or the like). The interference light beam L1 is sampled by periodically opening and closing (switching on and off) the shutter 31 based on a sampling function $m_1(t)$ shown in FIG. 2B.

The sampling function $m_1(t)$ has a waveform composed of, for example, a rectangular train with a duty of 50% and its frequency $f_{sm}$ is set to a value equal to the beat frequency $f_{if}$ indicated in the expression (1) or close to the beat frequency (that is, $f_{sm}=f_{if}$ or $f_{sm}\approx f_{if}$). It is preferable that the sampling function $m_1(t)$ have the waveform composed of the rectangular train with the duty of 50%. In other words, when the duty is smaller than 50%, it is not preferable because the quantities of light received by the CCDs 21, 22, and 23 decrease. On the other hand, even when the duty exceeds 50%, detection efficiency reduces (change in duty ratio causes a change in a factor $K_1$ of the following expression (2)). The opening and closing of each of the shutters 31, 32, and 33 are preferably switched by using the waveform composed of the rectangular train. A sampling function with a duty other than 50% or a sampling function having a waveform composed of a train other than the rectangular train, such as a sinusoidal wave or a triangular wave can be used as appropriate. Such a modification is used for sampling functions $m_2(t)$ and $m_3(t)$ as described later.

FIG. 2C shows a time waveform of the interference light beam L1 which is sampled using the sampling function $m_1(t)$ and allowed to enter the CCD 21. A difference between the frequency $f_{sm}$ of the sampling function $m_1(t)$ and the beat frequency $f_{if}$ of the heterodyne signal which is indicated in the expression (1) ($\delta f=|f_{if}-f_{sm}|$) is set to a value sufficiently smaller than a response frequency of the CCD 21 serving as the storage type photo sensor. Therefore, a part of the interference light beam L1 having substantially the same phase is sampled during each period thereof. At this time, an output $i_1(t)$ from the CCD 21 that receives the interference light beam L1 is proportional to the amount of photocharge stored in the CCD 21 during a measurement period. More specifically, the output $i_1(t)$ is expressed by the following expression (2) (for example, see M. Akiba, K. P. Chan, and N. Tanno, Optics Letters, Vol. 28, 816 (2003))

$$i_1(t) = \langle K_1 i(t) m_1(t) \rangle \qquad (2)$$
$$= K_1 \left[ \frac{1}{2} I_s + \frac{1}{2} I_r + \frac{2}{\pi} \sqrt{I_s I_r} \cos(2\pi \delta f t + \phi) \right]$$

Here, <-> indicates a time average produced by a storage effect of the CCD 21. In addition, $\phi$ indicates an initial phase value for measurement and $K_1$ indicates photo detection efficiency including reflectance of the beam splitter 11 and a photoelectric conversion rate of the CCD 21.

Similarly, the interference light beam L2 is sampled by the shutter 32 whose open-and-close timings are controlled based on the predetermined sampling function $m_2(t)$, and is then detected by the CCD 22. The sampling function $m_2(t)$ has a waveform of a rectangular train with a duty of 50% and its frequency $f_{om}$ is equal to that of the sampling function $m_1(t)$ for sampling the interference light beam L1. The sampling function $m_2(t)$ has a phase difference $\Delta\theta_{1,2}$ with the sampling function $m_1(t)$. The phase difference $\Delta\theta_{1,2}$ is caused by shifting a phase of a pulse signal from the pulse signal generator 50 shown in FIG. 1 by the phase shifter 42. Under the above-mentioned condition, the following output $i_2(t)$ is obtained from the CCD 22 based on the same fundamentals as the expression (2).

$$i_2 = K_2 \left[ \frac{1}{2} I_s + \frac{1}{2} I_r + \frac{2}{\pi} \sqrt{I_s I_r} \cos(2\pi \delta f t + \phi + \Delta\theta_{1,2}) \right] \qquad (3)$$

Here, $K_2$ indicates photo detection efficiency including transmittance of the beam splitter 11, reflectance of the beam splitter 12, and a photoelectric conversion rate of the CCD 22.

As is apparent from the expressions (2) and (3), each of the outputs from the CCDs 21 and 22 includes the term of intensity $I_s$ of the signal light S and the term of intensity $I_r$ of the reference light R. In addition, the output from the CCD 21 includes the term related to an amplitude $\sqrt{(I_s I_r)}$ of the interference light beam L1 and a phase $(2\pi\delta ft+\phi)$ thereof. The output from the CCD 22 includes the term related to an amplitude $\sqrt{(I_s I_r)}$ of the interference light beam L2 and a phase $(2\pi\delta ft+\Delta\theta_{1,2})$ thereof.

Similarly, the interference light beam L3 is sampled by the shutter 33 whose open-and-close timings are controlled based on the sampling function $m_3(t)$, and is then detected by the CCD 23. The sampling function $m_3(t)$ has a waveform of a rectangular train with a duty of 50% and its frequency $f_{\delta m}$ is equal to that of the sampling function $m_1(t)$ for sampling the interference light beam L1. The sampling function $m_3(t)$ has a phase difference $\Delta\theta_{1,3}$ within $m_1(t)$. The phase difference $\Delta\theta_{1,3}$ is caused by shifting a phase of a pulse signal from the pulse signal generator 50 by the phase shifter 43. At this time, the following output $i_3(t)$ is obtained from the CCD 23 based on the same fundamentals as the expression (2).

$$i_3 = K_3 \left[ \frac{1}{2} I_s + \frac{1}{2} I_r + \frac{2}{\pi} \sqrt{I_s I_r} \cos(2\pi \delta f t + \phi + \Delta\theta_{1,3}) \right] \qquad (4)$$

Here, $K_3$ indicates photo detection efficiency including transmittance of each of the beam splitters 11 and 12, and a photoelectric conversion rate of the CCD 23.

[Calculation Processing]

Electrical signals outputted from the CCDs 21, 22, and 23 as expressed by the expressions (2), (3), and (4) are transmitted to the signal processing portion 60. The signal processing portion 60 executes the calculation as described below using results outputted from the CCDs 21, 22, and 23. Therefore, the intensity of the heterodyne signal expressed by the expression (1) and the spatial phase distribution thereof, that is, the signal intensity of the interference light L and the spatial phase distribution thereof are calculated.

Here, the phase difference $\Delta\theta_{1,2}$ between the sampling function $m_1(t)$ and the sampling function $m_2(t)$ as indicated in the expression (3) is set to $-\pi/2$. The phase difference $\Delta\theta_{1,3}$ between the sampling function $m_1(t)$ and the sampling function $m_3(t)$ as indicated in the expression (4) is set to $\pi/2$. In this time, an intensity $S_1$ of the direct current component of the heterodyne signal which is composed of the background light of the interference light and phase quadrature components (sine component and cosine component) $S_2$ and $S_3$ thereof are expressed by the following respective expressions.

$$S_1 = \frac{i_2}{K_2} + \frac{i_3}{K_3} = I_s + I_r \qquad (5)$$

$$S_2 = \frac{i_2}{K_2} - \frac{i_3}{K_3} = \frac{4}{\pi} \sqrt{I_s I_r} \sin(2\pi \delta f t + \phi) \qquad (6)$$

$$S_3 = \frac{2i_1}{K_1} - S_1 = \frac{4}{\pi} \sqrt{I_s I_r} \cos(2\pi \delta f t + \phi) \qquad (7)$$

When the expressions (6) and (7) are used, the amplitude of the heterodyne signal expressed by the expression (1) is expressed by the following expression.

$$\sqrt{I_s I_r} \propto \sqrt{S_2^2 + S_3^2} \qquad (8)$$

Here, a proportionality factor related to the right side is $\pi/4$. Therefore, according to the optical image measuring apparatus 1 in this embodiment, even when the intensity of the direct current component composed of the background light is not measured in advance, the amplitude of the heterodyne signal can be calculated from the outputs of the three CCDs 21, 22, and 23. This indicates that the optical image measuring apparatus according to the present invention is effective for image measurement in which the intensity of the background light is hard to measure in advance, such as optical sectional image measurement for a moving object. It is unnecessary to separately measure the intensity of the direct current component composed of the background light, so that a measurement time can be shortened and a measurement process can be simplified.

According to the optical image measuring apparatus 1, the spatial phase distribution of the interference light L can be obtained for imaging by the following measurement method.

When the interference components $S_2(t_1)$ and $S_3(t_1)$ of the heterodyne signal which are expressed by the expressions (6) and (7) are obtained at a measurement time $t=t_1$, the following signal is calculated from a ratio of both the interference components.

$$S_4 = \frac{S_2(t_1)}{S_3(t_1)} = \tan(2\pi \delta f t_1 + \phi) \qquad (9)$$

As is apparent from the expression (9), a signal $S_4$ does not depend on the amplitude of the interference light L and includes only phase information thereof. Therefore, a phase $\phi(x, y, t_1)$ of the heterodyne signal which is detected and outputted from each of pixels of the CCDs 21, 22, and 23, each of which is the two-dimensional photo sensory array, is expressed by the following expression. Here, (x, y) indicates positional coordinates of each of the pixels on the CCDs.

$$\phi(x, y, t_1) = \tan^{-1}\left[\frac{S_2(x, y, t_1)}{S_3(x, y, t_1)}\right] - 2\pi \delta f t_1 \qquad (10)$$

It can be assumed that the second term $2\pi \delta f t_1$ of the expression (10) is an instantaneous phase value of an alternating current signal having a frequency $\delta f$ of zero or substantially zero at a measurement time $t_1$ and kept constant regardless of the positions (that is, variables x, y) of the pixels of the CCDs 21, 22, and 23. A difference between a phase $\phi(x_1, y_1, t_1)$ of a heterodyne signal detected from a pixel located at coordinates $(x=x_1, y=y_1)$ on the CCDs 21, 22, and 23 and a phase of a heterodyne signal detected from each of the pixels is obtained. Therefore, a spatial distribution of the phase differences between the heterodyne signals, that is, a spatial phase distribution of the interference light L can be imaged. It is expected that such measurement of the spatial phase distribution of the interference light is effective for image measurement using phase difference values as references, for example, high precision measurement on a mirror surface, which is performed by a heterodyne interference method.

When the phase information is used, frequency information of the interference light L can be obtained. That is, a phase difference $\delta f$ between the frequency $f_{if}$ of the heterodyne signal and the sampling frequency $f_{sm}$ is calculated by using the following expression based on phases $\phi(x, y, t_1)$ and $\phi(x, y, t_2)$ obtained by calculation at two measurement times $t=t_1$ and $t=t_2$.

$$\delta f = \frac{1}{2\pi}\left|\frac{\phi(x, y, t_1) - \phi(x, y, t_2)}{t_1 - t_2}\right| \qquad (11)$$

Because the sampling frequency $f_{sm}$ is known, the frequency $f_{if}$ of the heterodyne signal, that is, the frequency of the interference light L can be calculated based on a result calculated from the expression (11). It is expected that the heterodyne frequency measuring method is effectively usable for Doppler velocity measurement using the heterodyne interference method, such as blood flow measurement on a fundus of an eye to be examined.

According to the calculation method described above, the phase difference $\Delta\theta_{1,2}$ between the sampling function $m_1(t)$ and the sampling function $m_2(t)$ is set to $-\pi/2$ and the phase difference $\Delta\theta_{1,3}$ between the sampling function $m_1(t)$ and the sampling function $m_3(t)$ is set to $\pi/2$. The amplitude and phase of the heterodyne signal are measured without preliminary measurement of the intensity of the background light. It is also possible that $\Delta\theta_{1,2}$ and $\Delta\theta_{1,3}$ are set to other values as appropriate and the measurement is performed. Various modifications can be made. For example, the optical path of the interference light L is divided into four or more. As in the above case, the interference light propagating on each of the optical paths is subjected to sampling processing and detected to extract an interference component from the interference light L, and then the signal intensity of the interference light and the spatial phase distribution thereof are obtained.

According to the optical image measuring apparatus 1 of the present invention, the intensity of the direct current component composed of the background light of the interference light can be calculated based on the output signals from the two-dimensional photo sensor arrays such as the three CCDS as expressed by the expressions (2), (3), and (4). The intensity of the heterodyne signal and the phase information thereof, that is, the signal intensity of the interference light L and the spatial phase distribution thereof can be obtained based on a result obtained by the calculation. This is a feature of the present invention which is significantly different from the invention described in JP 2001-330558 A in which it is necessary to measure the intensity of the direct current component composed of the background light of the interference light in advance.

VARIOUS MODIFIED EXAMPLES

First Modified Example

Figure 3:
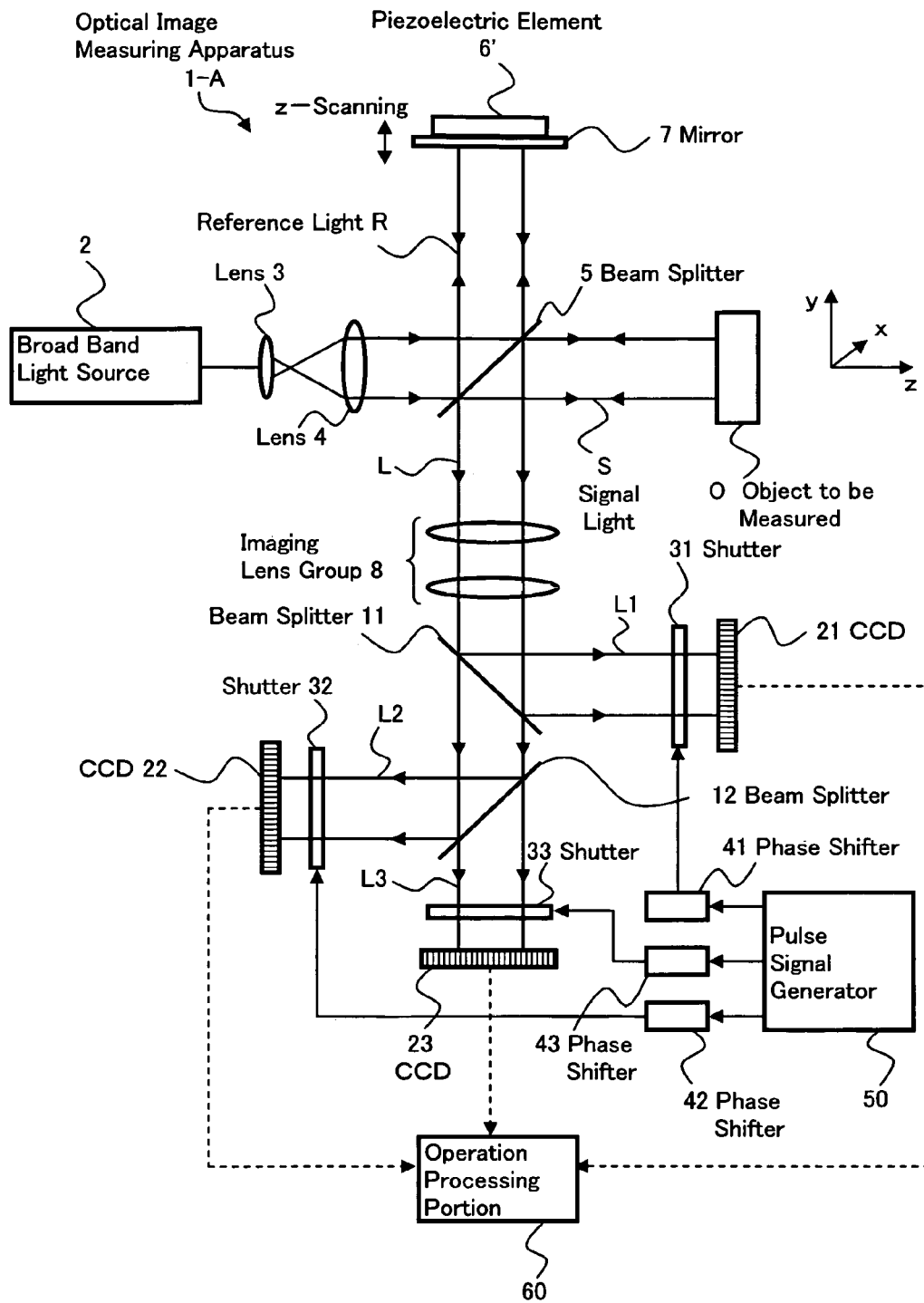
FIG. 3 is a schematic diagram showing a modified example of an optical image measuring apparatus according to the embodiment of the present invention.

FIG. 3 shows a first modified example of the optical image measuring apparatus of the present invention. An optical image measuring apparatus 1-A has substantially the same structure as that of the optical image measuring apparatus 1 shown in FIG. 1. Note that a vibrating element such as a piezoelectric element 6', which is used for a mechanism for generating a beat frequency in optical heterodyne measurement, is provided in the rear of the mirror 7 for reflecting the reference light R. The reference light R is subjected to Doppler frequency shift by vibration of the mirror 7. The piezoelectric element 6' has the same function as that of the frequency shifter 6 in the optical image measuring apparatus 1.

Second Modified Example

Figure 4:
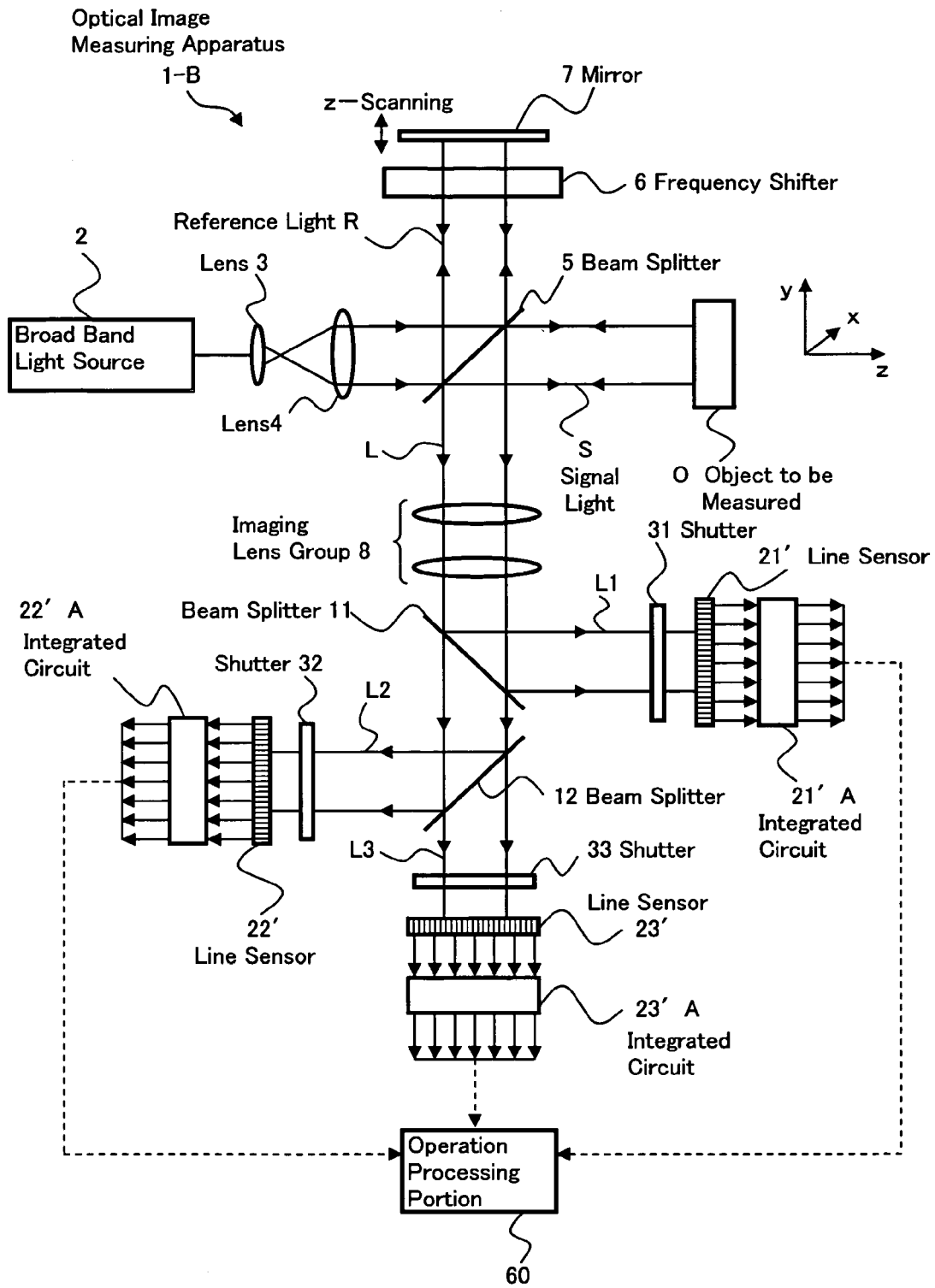
FIG. 4 is a schematic diagram showing a modified example of an optical image measuring apparatus according to the embodiment of the present invention.

FIG. 4 shows a second modified example of the optical image measuring apparatus of the present invention. An optical image measuring apparatus 1-B has substantially the same structure as that of the optical image measuring apparatus 1 shown in FIG. 1. Note that line sensors 21', 22', and 23' are used as the first and third photo detectors instead of the CC-Ds 21, 22, and 23. Integration circuits 21'A, 22'A, and 23'A for integrating outputs of respective light receiving elements arranged on the line sensors 21', 22', and 23' are provided. Output signals of the integration circuits 21'A, 22'A, and 23'A are transmitted to the signal processing portion 60. In FIG. 4, the phase shifters 41, 42, and 43 and the pulse signal generator 50 as shown in FIG. 1 are omitted.

According to this structure, a one-dimensional image can be obtained by each of the line sensors 21', 22', and 23'. In addition, the same sampling processing as that in the optical image measuring apparatus 1 shown in FIG. 1 can be performed by storage functions of the integration circuits 21'A, 22'A, and 23'A. Therefore, the direct current component composed of the background light of the interference light can be calculated by the signal processing portion 60. The signal intensity of the interference light and the spatial phase distribution thereof can be obtained based on a result obtained by the calculation.

Third Modified Example

Figure 5:
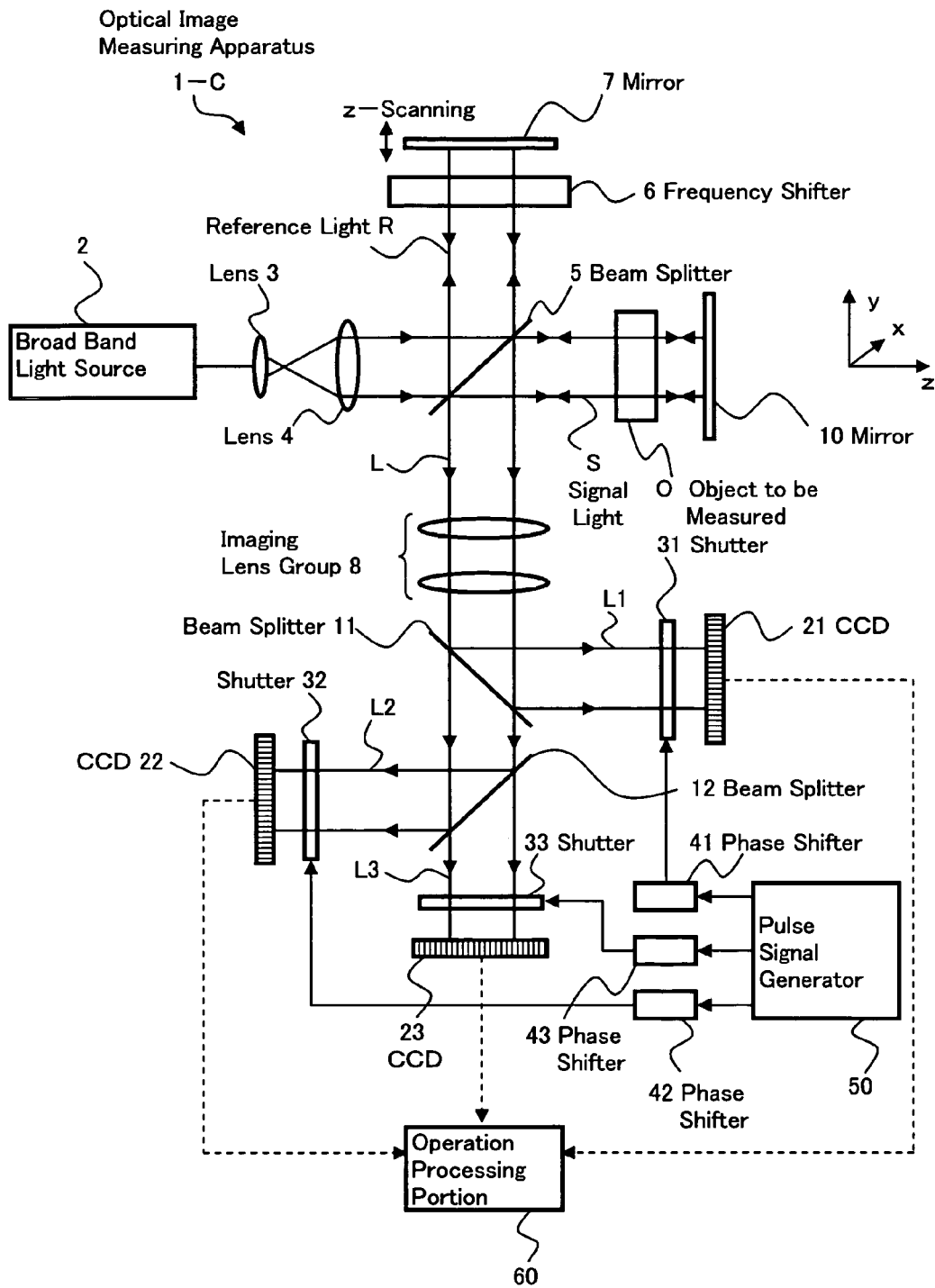
FIG. 5 is a schematic diagram showing a modified example of an optical image measuring apparatus according to the embodiment of the present invention.
Figure 6:
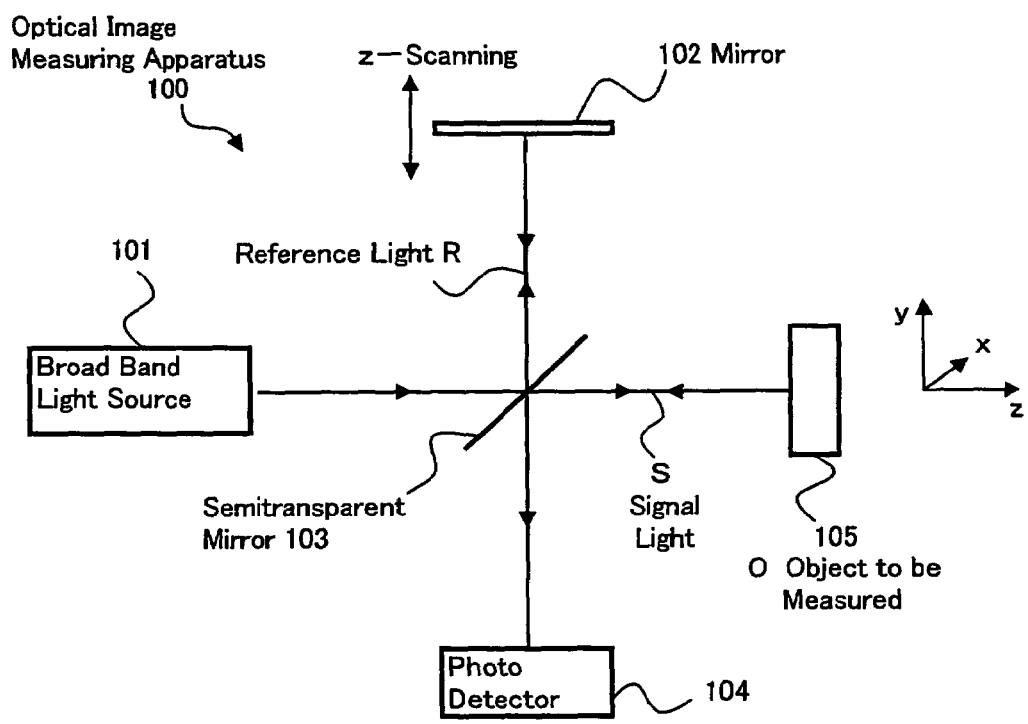
FIG. 6 is a schematic diagram showing a conventional optical image measuring apparatus.
Figure 7:
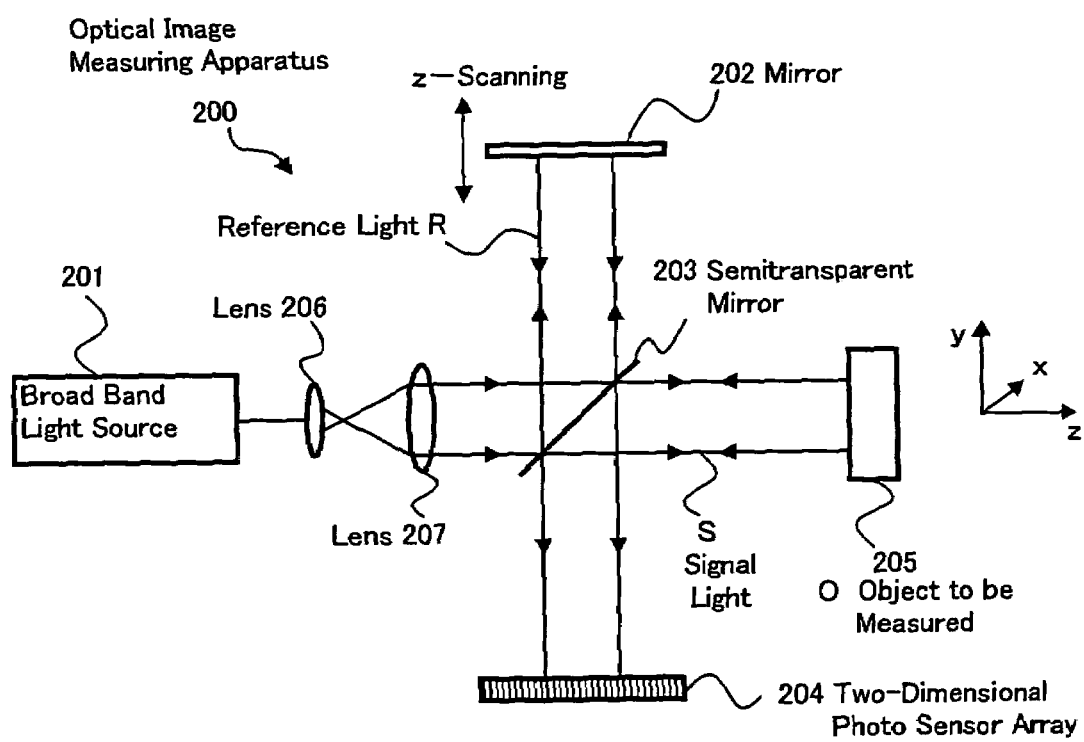
FIG. 7 is a schematic diagram showing a conventional optical image measuring apparatus.

FIG. 5 shows a third modified example of the optical image measuring apparatus of the present invention. An optical image measuring apparatus 1-C has substantially the same structure as that of the optical image measuring apparatus 1 shown in FIG. 1. Note that a mirror 10 for reflecting the signal light S transmitting through the object to be measured o to the beam splitter 5 is provided in the optical image measuring apparatus 1-C of this modified example. The signal light S separated by the beam splitter 5 transmits through the object to be measured o and is reflected on the mirror 10. Then, the signal light S transmits through the object to be measured o again and is superimposed on the reference light R by the beam splitter 5.

According to the optical image measuring apparatus 1-C having the above-mentioned structure, the interference light includes information related to the signal light S transmitting through the object to be measured o. As in the optical image measuring apparatus 1 shown in FIG. 1, the three divided interference light beams are sampled and then detected by the CCDs 21, 22, and 23. Therefore, the direct current component composed of the background light of the interference light can be calculated based on a result obtained by the detection. The signal intensity of the interference light and the spatial phase distribution thereof can be obtained based on a result obtained by the calculation. The optical image measuring apparatus 1-C of the third modified example is an example of an apparatus that performs a heterodyne detection method based on the signal light transmitting through the object to be measured o. When such a transmission type optical image measuring apparatus is constructed, it is possible to use not only a light source for emitting low-coherent light but also a general semiconductor laser or the like.

Other Modified Examples

The number of divided interference light beams in the optical image measuring apparatus of the present invention is not limited to three as in the above-mentioned embodiment. The interference light may be divided into four or more as appropriate. In this case, it is preferable that ((the number of divided interference light beams)−1) beam splitters be provided and a photo sensor such as a CCD be provided for each of the divided interference light beams. It is sufficient that the number of light quantity changing means such as shutters disposed on the optical paths of the plurality of divided interference light beams be three in the case where the calculation processing described in the above-mentioned embodiment is performed. When another calculation processing is performed or when other values are further calculated, four or more light quantity changing means can be provided as appropriate.

When the signal intensity of the interference light and the spatial phase distribution thereof are obtained without separate measurement of the intensity of the direct current component of the heterodyne signal, it is assumedly necessary to divide the interference light into three or more. When the optical image measuring apparatus has two photo sensors as in JP 2001-330558 A, it is necessary to set a phase difference between sampling periods of the two divided interference light beams to $\pi/2$. However, when the interference light is divided into three or more for sampling as in the present invention, a purpose can be achieved by using an adequate phase difference other then $\pi/2$. Therefore, the degree of freedom of measurement increases.

In the above-mentioned embodiment, the shutters such as the high-speed shutters are provided as "the light quantity changing means" included in "the sampling means". However, the present invention is not limited to those. For example, liquid crystal shutters for periodically changing transmittances of transmitted interference light beams may be provided for sampling instead of the shutters that completely cut off the interference light beams to change the quantities of light received by the photo detectors. The light quantity changing means can be integrally formed with the photo detector as appropriate.

Various types of one-dimensional or two-dimensional devices having both a function for detecting the interference light beams and performing photoelectric conversion thereon and a function for storing detected charges, such as the CCDs 21, 22, and 23 and the line sensors 21', 22', and 23' including the integration circuits 21'A, 22'A, and 23'A can be used as the photo detectors in the optical image measuring apparatus according to the present invention.

In the embodiment of the present invention, the optical image measuring apparatus having the Michelson type interference optical system is described. It is also possible to use another interference optical system such as a Mach-Zehnder type interference optical system (for example, see JP 3245135 B made by the inventors of the present invention).

An optical fiber (bundle) used as a light guide member is provided in a part of the interference optical system. Therefore, the degree of freedom of apparatus design can be improved, the apparatus can be made compact, or the degree of freedom of location of the object to be measured can be improved (for example, see JP 3245135 B).

When the optical image measuring apparatus of the present invention is applied in, for example, an ophthalmologic field, two-dimensional sectional images of retina and cornea can be obtained in addition to the blood flow measurement on the eye fundus. Therefore, it is possible to measure, for example, the number of endothelial cells of the cornea. Various other applications are also possible.

The above-mentioned detailed structures are merely examples of the optical image measuring apparatus according to the embodiment of the present invention. Thus, various modifications can be made without departing from the spirit of the present invention.

What is claimed is:

1. An optical image measuring apparatus for forming an image of an object to be measured based on interference light, comprising:
   a light source for emitting a light beam;
   an optical interference system that divides the light beam emitted from the light source into signal light propagating through the object to be measured and reference light propagating through a predetermined reference object, shifts a frequency of the signal light and a frequency of the reference light relative to each other, and then superimposes the signal light propagating through the object to be measured and the reference light propagating through the predetermined reference object on each other to produce the interference light;

sampling means for dividing the interference light produced by the optical interference system into at least three interference light beams, sampling at least the three interference light beams at predetermined intervals, and outputting the sampled interference light beams as electrical signals; and calculation means for calculating a signal intensity of the interference light and a spatial phase distribution thereof based on the electrical signals outputted from the sampling means.

2. An optical image measuring apparatus according to claim 1, wherein the sampling means comprises:

a plurality of beam splitters for dividing the interference light produced by the optical interference system into two;

light quantity changing means for sampling the interference light beams separated by the plurality of beam splitters by changing quantities of the interference light beams propagating on optical paths thereof at the predetermined intervals, which is located on the optical paths; and a photo detector for detecting the interference light beams sampled by the light quantity changing means and converting the detected interference light beams into the electrical signals.

3. An optical image measuring apparatus according to claim 2, wherein the light quantity changing means comprises a shutter for sampling the interference light beams separated by the plurality of beam splitters by changing quantities of the interference light beams propagating on optical paths thereof at the predetermined intervals, which is located on the optical paths.

4. An optical image measuring apparatus according to claim 2, wherein the interference optical system comprises an optical element for increasing a beam diameter of the light beam from the light source, and the photo detector comprises a two-dimensional photo detector array for detecting the interference light produced by the interference optical system based on the light beam whose beam diameter is increased by the optical element.

5. An optical image measuring apparatus according to claim 2, wherein the sampling means comprises:

a first beam splitter for dividing the interference light produced by the optical interference system into first and second interference light beams;

first light quantity changing means for sampling the first interference light beam of the interference light divided by the first beam splitter by changing a quantity of the first interference light beam propagating on an optical path thereof at the predetermined intervals, which is located on the optical path of the first interference light beam;

a first photo detector for detecting the first interference light beam sampled by the first light quantity changing means and converting the detected first interference light beam into an electrical signal;

a second beam splitter for dividing the second interference light beam of the interference light divided by the first beam splitter into third and fourth interference light beams;

second light quantity changing means for sampling the third interference light beam of the second interference light beam divided by the second beam splitter by changing a quantity of the third interference light beam propagating on an optical path thereof at the predetermined intervals, which is located on the optical path of the third interference light beam;

a second photo detector for detecting the third interference light beam sampled by the second light quantity changing means and converting the detected third interference light beam into an electrical signal;

third light quantity changing means for sampling the fourth interference light beam of the second interference light beam divided by the second beam splitter by changing a quantity of the fourth interference light beam propagating on an optical path thereof at the predetermined intervals, which is located on the optical path of the fourth interference light beam; and a third photo detector for detecting the fourth interference light beam sampled by the third light quantity changing means and converting the detected fourth interference light beam into an electrical signal.

6. An optical image measuring apparatus according to claim 5, wherein the calculation means calculates an amplitude of an alternating current component of the interference light based on the electrical signals from the first photo detector, the second photo detector, and the third photo detector.

7. An optical image measuring apparatus according to claim 6, wherein the calculation means calculates a sine component and a cosine component of the alternating current component of the interference light based on the electrical signals from the first photo detector, the second photo detector, and the third photo detector, and calculates the amplitude based on the sine component and the cosine component.

8. An optical image measuring apparatus according to claim 5, wherein the first beam splitter divides the interference light produced by the interference optical system into the first and second interference light beams at an intensity ratio of 1:2, and the second beam splitter divides the second interference light beam propagating on the optical path thereof into the third and fourth interference light beams whose intensities are equal to each other.

9. An optical image measuring apparatus according to claim 5, wherein the calculation means calculates a spatial phase distribution of the interference light based on the electrical signals from the first photo detector, the second photo detector, and the third photo detector.

10. An optical image measuring apparatus according to claim 9, wherein the calculation means calculates a sine component and a cosine component of the alternating current component of the interference light at a certain measurement time based on the electrical signals from the first photo detector, the second photo detector, and the third photo detector, and calculates the spatial phase distribution based on the sine component and the cosine component.

11. An optical image measuring apparatus according to claim 10, wherein the calculation means calculates a frequency of the interference light based on calculated spatial phase distributions of the interference light at two measurement times.

12. An optical image measuring apparatus according to claim 9, wherein the calculation means calculates a frequency of the interference light based on calculated spatial phase distributions of the interference light at two measurement times.

13. An optical image measuring apparatus according to claim 1, wherein the sampling means divides the interference light into at least the three interference light beams such that intensities of the interference light beams are equal to one another.

* * * * *